United States Patent [19] [11] 4,098,311
Larsson [45] Jul. 4, 1978

[54] FORESTRY MACHINES
[75] Inventor: Carl Larsson, Kisa, Sweden
[73] Assignee: Kisa Tra AB, Kisa, Sweden
[21] Appl. No.: 745,298
[22] Filed: Nov. 26, 1976
[51] Int. Cl.² .......................... A01G 23/08; B27L 1/00
[52] U.S. Cl. ............................. 144/309 AC; 144/2 Z;
241/101.7
[58] Field of Search .................. 144/2 Z, 3 D, 208 R,
144/208 E, 162 R, 309 AC, 311; 241/73, 74, 92,
101.7

[56] References Cited
U.S. PATENT DOCUMENTS

| | | | |
|---|---|---|---|
| 3,529,639 | 9/1970 | Herolf | 144/2 Z |
| 3,822,042 | 7/1974 | Roy | 241/101.7 |
| 3,955,765 | 5/1976 | Gaitten | 144/162 R X |
| 3,963,064 | 6/1976 | Hayes | 144/309 AC |
| 3,972,358 | 8/1976 | Kappler | 144/2 Z |

FOREIGN PATENT DOCUMENTS 1,956,462  6/1970  Fed. Rep. of Germany ....... 144/2 Z Primary Examiner—Othell M. Simpson
Assistant Examiner—W. D. Bray
Attorney, Agent, or Firm—Schiller & Pandiscio

[57] ABSTRACT

The invention relates to a method and apparatus for recovering forestry products in an economic manner, and in particular utilizes a base machine capable of recovering efficiently all the wood products obtained when logging timber.

7 Claims, 6 Drawing Figures

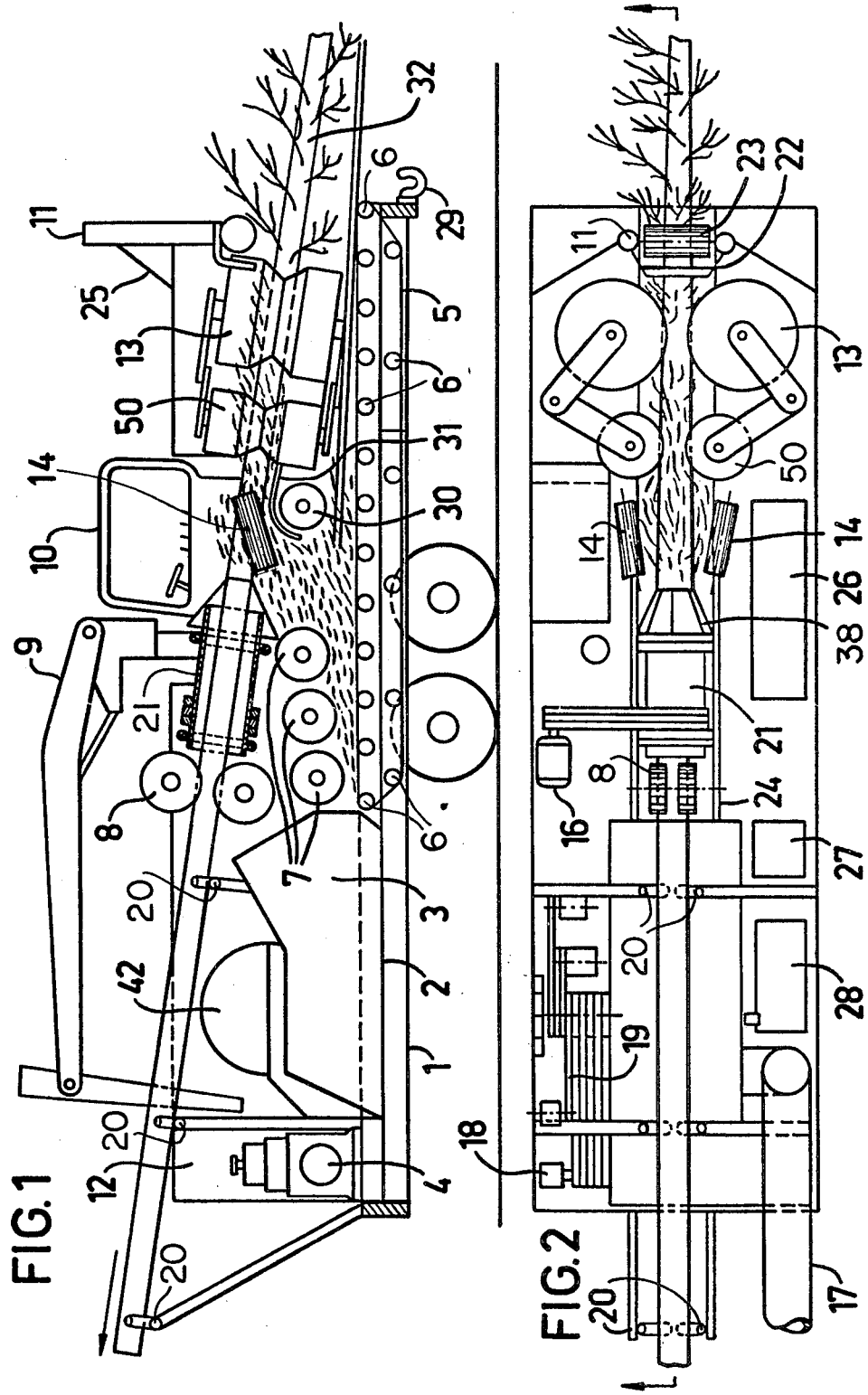

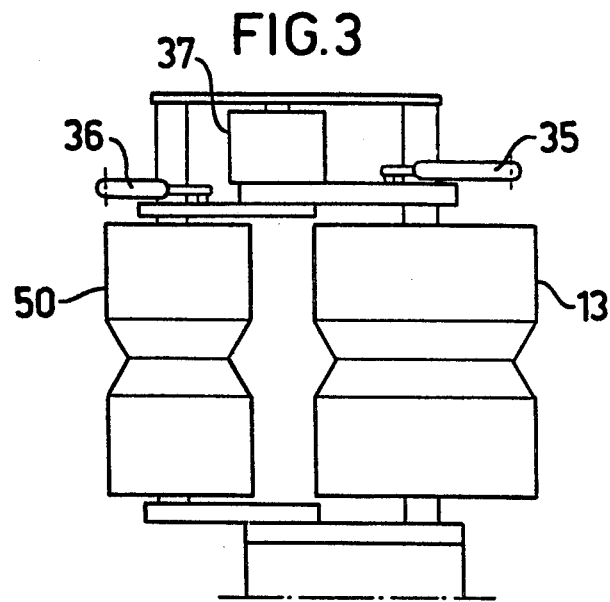
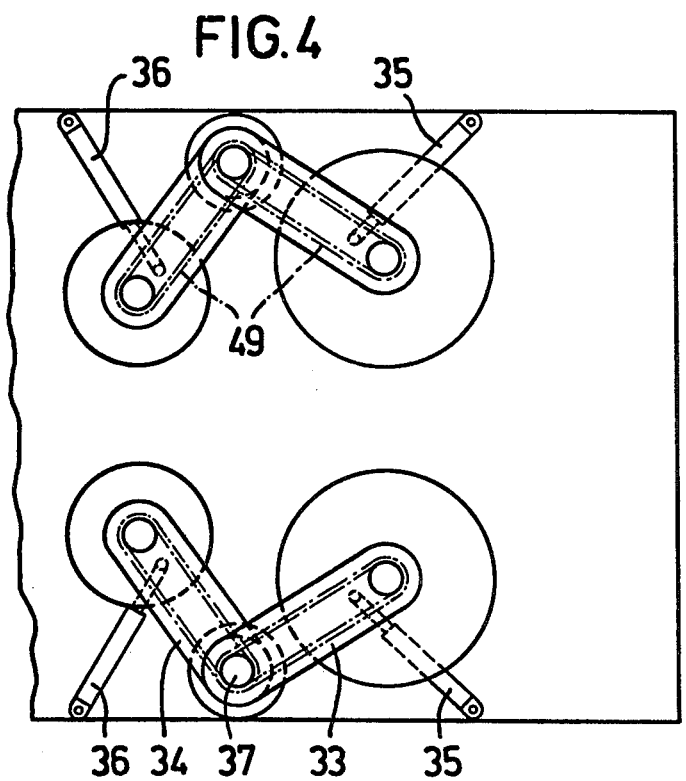

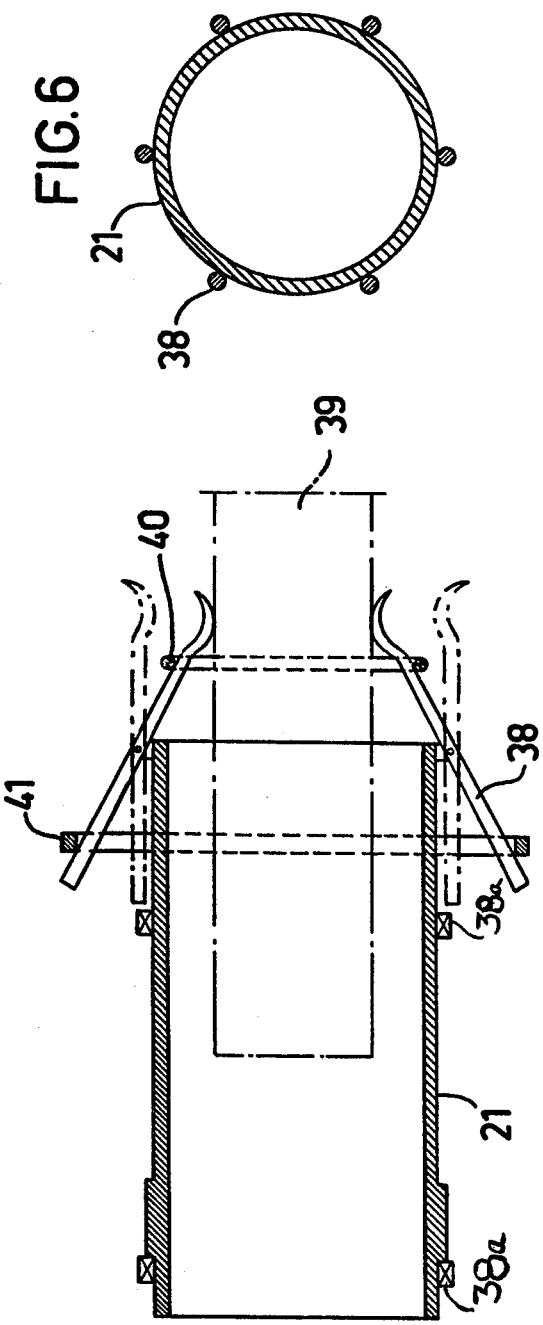

FORESTRY MACHINES

In accordance with the method a felled tree is fed into the base machine in the direction of its longitudinal axis with its root end leading, the branches and twigs are pressed to lie flat against the trunk during feeding towards a de-branching station, severed branches and twigs which are in substantial alignment, together with a severed top part of the tree, are then fed via a conveyor to a chipper, chips and pine needles obtained from the chipper being separated and recovered separately.

In order to recover completely forestry products in an economic manner it is necessary to have on site a base machine capable of recovering efficiently all wood products obtained when logging timber in accordance with the so called half-trunk method without requiring excessive work on the part of personnel.

In addition to the actual timber obtained from a felled tree, which tree should be cut to desired dimensions on the felling site, these products comprise bark, saw-dust, chips, greenwood, pine needles and like products.

A tree may be felled manually with a motor saw or mechanically with a hydraulically-operated cross-cut saw, whereafter the trunk is usually cut into from one to three sections, and a further section comprising the upper portion of the tree, this latter section being referred to as the "half-tree". Branches and twigs are removed from trunk sections having a diameter of 30 cm or more. The felled tree is usually transported to a working site by means of a motorised vehicle, optionally provided with an extensible unit. On the working site a base machine is normally provided, and the invention relates to such a machine. The base machine is usually moveable, for example, by means of a tractor or some similar towing-vehicle and is provided with a separate motor which may well have a horse power of approximately 260 hp to drive a feed mechanism for trunk sections and half-trunks.

An object of the invention is to provide a method and apparatus for the efficient recovery of forestry products as well as the efficient use of manpower for the recovery operation.

A base machine according to the invention is operative to press the branches together so that said branches are fed endwise into a de-branching drum (hogging cylinder) of a rotary de-branching apparatus, which may be controlled photo-electrically, a chipper is arranged on the frame of the machine and the removed branches and twigs are fed endwise into the chipper via a conveyor. The chipper may be provided with one or more centrifugal fans which, in turn, co-operate with tubes through which chips and/or pine needles, bark etc. are blown. Suitably, the tubes are directed into containers, which are filled directly for further transport. The base machine may also be provided with a crane having a foldable arm and gripping devices intended to pull a half-trunk and optionally trunk sections into the feed mechanism of the machine and means for topping a felled tree.

The various parts of the base machine are arranged to co-act with each other preferably in a manner such that the individual trunk sections and the chips are discharged separately, wherewith fans may be arranged in the pathway of the chips from the chipper so as to screen pine needles etc from the chips and remove the needles etc therefrom by centrifugal force, the needles etc. being collected in a separate container. The pine needles etc. recovered, referred to hereinafter as "pine needles" may be used for conversion to animal fodder.

The various parts and units of the universal machine are suitably driven hydraulically or electrically by the engine of the machine. Optionally, the machine may be provided with additional cutting devices provided with length-measuring instruments. The containers filled with chips or pine needles are then removed by means of motorised vehicles in a manner known per se. In principle, the base machine according to the present invention is intended to be operated by only one man. The preferred requirements for manoeuvrability of the base machine are that it shall be capable of being moved on the working site and that it shall be capable of carrying out the following operations.

With the aid of a single manoeuvring crane having a wide operating span, it shall be possible to drag, preferably long and slender pieces of wood with branches and pine needles still attached, to the actual base machine and to feed the same into said machine, whereupon the wood is de-branched. At least the branches are cut into chips (greenwood). The pine needles and greenwood are mutually separated in a suitable screening device and are loaded by means of suitable transporters into containers onto a container carriage which may be front-coupled.

The quantity of industrial wood recovered can be increased significantly compared to that which has been possible with mechanical operation, owing to the fact that the tree, by use of a base machine according to the invention, can be recovered efficiently up to a 4 cm top diameter, wherewith the recovery of greenwood and pine needles is also of economic significance, such recovery not previously being possible.

The invention also affords other advantages from the aspect of forest hygiene. For example, the spawning of harmful insects is reduced and preparation of the ground and other re-growth measures is facilitated.

The base machine is preferably provided with an individual power source in the form of a motor which carries out the wood-treating work. The base machine can be moved within the working area by means of a tractor whose operating devices are connected to and controlled from the cabin of the base machine, preferably hydraulically.

When a container carriage is front-coupled to the tractor, which may be suitable when the container carriage is to be moved only through small distances, the control signals may also be transmitted hydraulically to the wheels of the container carriage. In this way, movement of the container carriage within the working site may be effected from the operating cabin of the base machine. When driving on roads and highways, the base machine would be towed by the tractor. The container carriage may then have the form of an additional trailer. When the wheels of the container carriage can be steered, steering of the wheels is prevented in the transport direction in a known manner.

An embodiment of a base machine according to the present invention will now be described in more detail and with reference to the accompanying drawing; in which:

FIG. 1 is a schematic sectional view of the machine,
FIG. 2 is a schematic top plan view of the same machine;
FIG. 3 is a side view of feed-in means;
FIG. 4 is a schematic top plan view of the same means;

FIG. 5 is a schematic sectional view of the de-branching drum of the base machine; and FIG. 6 is a section through the de-branching drum.

Referring to the drawing, the base machine comprises a chassis 1 and a further chassis 2 arranged on said chassis 1. The part referenced 3 contains a chipper having an outlet pipe 17 (see FIG. 2) for chips produced, whilst the reference 4 identifies a motor for driving the working parts of the base machine, said motor suitably being a diesel motor and developing around 200–300 hp. Conveyor means are provided suitably in the form of a belt conveyor 5 with support rollers 6, and press rolls 7 are provided for feeding removed branches and the like towards the conveyor belt. A pair of feed rolls 8 are provided for de-branched trunk sections and an extensible crane 9 is also provided operable from a cabin 10.

Arranged at the loading end of the base machine are drive rolls 13 provided with a guide groove for an infed trunk section. Obliquely positioned cleaning rolls 14 are arranged behind the rolls 13 and behind the rolls 14 are arranged de-branching knives 38 which are provided on a de-branching drum 21 which is rotatably mounted and driven by a hydraulic or electric motor 16, or the like, via a belt transmission.

Arranged at the loading, or in-feed end of the machine are topping shears 22, a pressure roll 23 arranged to press branches and the like together, and a separate drive roll 30 having a protective plate 31 for the topped portion 32 of the tree to be fed to the chipper 3.

The drive motor 4 of the base machine operates via a belt transmission 19 on a hydraulic pump 18 and, optionally, directly on the chipper 3.

Further elements of the machine include an inner shield plate 24, a hydraulic cylinder 11 for the topping shears 22 and a further shield plate 12. Support means for the hydraulic cylinder 11 are shown at 25 and a tank for the hydraulic oil is shown at 26. A fuel tank 28 is provided for the vehicle as well as a location for a tool box 27, both items being accommodated within the outer confines of the base machine. Support rollers 20 are provided for the treated and discharged trunk section, as well as a hook 29 to facilitate transportation of the machine.

FIGS. 3 and 4 show schematically the in-feed machinery of the base machine. This machinery comprises two pairs of rolls 13 and 50 respectively, each of which has a deep V-shaped guide groove around the periphery thereof, said guide groove being arranged to grip around the trunk. The groove, as also the rolls generally, may suitably be provided with an undulating surface to increase the gripping power thereof. The rolls are pivotally arranged on pivot arms 33 and 34 (FIG. 4) and are arranged to be urged in a direction towards the centre line of the treated trunk section by hydraulic cylinders 35 and 36. The pressure to be applied against the trunk section must be significant since outwardly projecting branches must be pressed against the side of the trunk. The rolls are operated hydraulically by means of drive chains 49 which permit the pivot arms to pivot around fixed shafts 37. A certain amount of resilience is required, however, because the rollers must resiliently follow the contours of the trunk section and the collapsed branches.

In use of the machine, logs are passed from the feed arrangement into the de-branching drum 21, as shown in FIGS. 5 and 6. The de-branching drum comprises the drum body having peripherally arranged around one end thereof branch cutters 38. The branch cutters are arranged to follow resiliently the peripheral contours of a trunk section. This "springing" action is obtained, for example, by means of a resilient heavy elastic belt 40, and reference 41 indicates a guide. The cutters 38 are replaceable and in this embodiment six cutters are provided. The guide 41 is guided in turn by a photo cell in a manner to fully open the cutters 38 when no trunk section is present in the de-branching zone. The drum is rotated by means of drive belts extending from the previously mentioned hydraulic or electric motor 16. Part of the trunk is shown at 39 and reference 38a indicates the drum bearings.

The de-branched trunk is fed by the drive rollers 13 and 50 (shown to the left in FIG. 1) in the direction of the arrow, and is supported during this movement by one or more pairs of the support rollers 20. When the drive rollers 13 and 50 are no longer in engagement with the top end of the trunk, the drive is taken over by a further pair of drive rollers 8 located behind the de-branching drum 21. The drive rollers 8 are provided with rubber tyres, two on each, for moving the trunk section without damage; alternatively pegged rollers could be used to prevent damage.

The branches and knots, together with needles, leaves and pieces of bark thereon, separated by the cutters 38 of the de-branching drum, are fed in substantial alignment by the cleaning rolls 14 conveyor 5 and are then fed into the chipper 3 by means of the feed rollers 7. The chipper may be of conventional construction with a rotating cutting iron operating at, or substantially at, right angles to the incoming branches. The chipper 3 is conveniently incorporated with a fan, shown schematically at 42 in FIG. 1. By means of the fan and a screen, it is possible to grade the chips and pine needles when it is required to recover the pine needles separately. Suitably, moveable air-blowing drums may be provided to transfer the chips and pine needles to separate containers.

Subsequent to the trunk section having passed the drive rollers 8, said section is fed further along the conveyor path and placed in different heaps, which heaps are subsequently placed in position by the crane 9.

The top end of the tree is cut by means of the topping device which forces down and feeds the topped section of the tree towards the feed roller 30 and down onto the conveyor belt 5, which moves the said top end towards the chipper, where it is chipped in the same way as the branches.

The control and operating devices of the base machine are collected in the operating cabin 10 and known photo electric devices can be used to simplify operation, said operations being mainly restricted to feeding the trunk sections by means of the crane 9 into the base machine and sorting and removing the finished wood.

By means of a base machine constructed in accordance with the invention, forestry products can be recovered effectively in the manner hereinbefore described with a consequent reduction in the work force required.

I claim:

1. A base machine for on-site recovery of felled trees, said trees having an elongate trunk comprising (1) a root end, (2) a top end, and having (3) bark and elongate branches and twigs attached thereto, said machine comprising in combination:

a chassis:

debranching means supported on said chassis for severing said branches and twigs from said trunk close to said bark;

chipping means for chipping said severed branches and twigs;

a first feed means for feeding said tree, root end leading through said debranching means, said first feed means being arranged to press said branches and twigs against said trunk thereby to orient the unattached ends of said branches and twigs towards the top end of said tree and generally parallel to one another in their elongate dimension for severing by said debranching means;

a second feed means for feeding said severed, generally parallel oriented branches and twigs into said chipper wherein said branches and twigs may be cut substantially at right angles to their elongate dimension; and means for driving said debranching, chipping, and first and second drive means.

2. Apparatus according to claim 1, wherein said conveyor means are adapted to collect and convey branches and twigs with the ends of the larger diameter, leading, and the chipper has cutting devices which act on the branches and twigs substantially at right-angles to their substantially aligned feed direction.

3. Apparatus according to claim 1, wherein said means for conveying comprises a multiplicity of drive rolls, each having a guide groove therein for an infed trunk, said rolls being arranged in pairs and adapted to be pressed against said trunk under a pressure of magnitude such that said branches and twigs are pressed substantially flat along said trunk.

4. Apparatus according to claim 1 further comprising:
(1) means for severing the top end of said tree from said root end, and (2) a drive roll arranged to urge said severed top towards said means for conveying so that said top together with said severed branches and twigs are conveyed to said chipper.

5. In a method of harvesting felled trees, said trees having an elongate trunk comprising (1) a root end, (2) a top end, and having (3) bark and elongate branches and twigs attached thereto, by delivering said felled tree, root end leading, to a base machine including a debranching station in which said trunk is debranched near the bark, and the branches and twigs are then chipped in a chipper, the improvement which comprises pressing said branches and twigs against said trunk thereby to orient the unattached ends of said branches and twigs towards the top end of said trunk and generally parallel with one another in their elongate dimension, feeding said tree through said debranching station so as to sever said branches and twigs from said trunk while maintaining said parallel orientation, feeding said severed, generally parallel oriented branches and twigs to said chipper where said branches and twigs are cut substantially at right angles to their elongate dimension.

6. In a method according to claim 5, wherein said trees comprise pine trees and include pine needles carried on said branches and twigs, and said pine needles are removed in said branching station and fed to said chipper, including the steps of separating and recovering said pine needles from said chipped branches and twigs.

7. In a method according to claim 5 including the step of severing the top end of said tree from said trunk, and feeding said severed top end together with said severed branches and twigs to said chipper station.

* * * * *